United States Patent [19]
Fosnight et al.

[11] Patent Number: 6,164,664
[45] Date of Patent: Dec. 26, 2000

[54] KINEMATIC COUPLING COMPATIBLE PASSIVE INTERFACE SEAL

[75] Inventors: William J. Fosnight; Joshua W. Shenk, both of Austin, Tex.; Perry Peterson, Mountain View, Calif.

[73] Assignee: Asyst Technologies, Inc., Fremont, Calif.

[21] Appl. No.: 09/049,330

[22] Filed: Mar. 27, 1998

[51] Int. Cl.$^7$ .................................................... F16J 15/48
[52] U.S. Cl. ......................... 277/635; 277/646; 414/217
[58] Field of Search ................................... 277/635, 636, 277/646; 414/8, 217, 937, 939

[56] References Cited

U.S. PATENT DOCUMENTS

| | | |
|---|---|---|
| 4,129,145 | 12/1978 | Wynn . |
| 4,135,698 | 1/1979 | Thate et al. . |
| 4,532,970 | 8/1985 | Tullis et al. . |
| 4,534,389 | 8/1985 | Tullis . |
| 4,681,193 | 7/1987 | Crowe . |
| 4,724,874 | 2/1988 | Parikh et al. . |
| 4,813,692 | 3/1989 | Halling et al. ............................ 277/636 |
| 4,836,499 | 6/1989 | Steele et al. ............................. 277/646 |
| 5,102,150 | 4/1992 | Kahn ........................................ 277/646 |
| 5,133,561 | 7/1992 | Hattori et al. ........................... 277/646 |
| 5,482,161 | 1/1996 | Williams et al. . |
| 5,611,452 | 3/1997 | Bonora et al. . |
| 5,683,118 | 11/1997 | Slocum . |
| 5,931,631 | 8/1999 | Bonora et al. . |

*Primary Examiner*—Anthony Knight
*Assistant Examiner*—John L. Beres
*Attorney, Agent, or Firm*—Fliesler Dubb Meyer & Lovejoy LLP

[57] ABSTRACT

An interface seal between a gas flow line within a support surface for a pod and a flow valve mounted within the pod. The kinematic coupling between a pod and support surface aligns a pair of inlet and outlet valves on a bottom surface of the pod with a corresponding pair of inlet and outlet holes in the support surface, through which gas may be injected into and removed from the pod, respectively. The interface according to the various embodiments of the invention provides a durable seal substantially preventing leakage between the pod and support surface while at the same time being compatible with kinematic couplings. In embodiments of the invention, the seal is thin and flexible, and expands into engagement with the pod to establish the seal. This type of interface seal will not interfere with the proper seating of the pod on the kinematic pins. Moreover, in a relaxed state, embodiments of the interface seal extend only a small distance above the support surface, and have no edges that are capable of catching on the pod as the pod is loaded or removed at low angles.

18 Claims, 7 Drawing Sheets

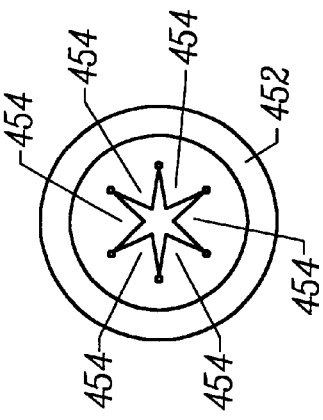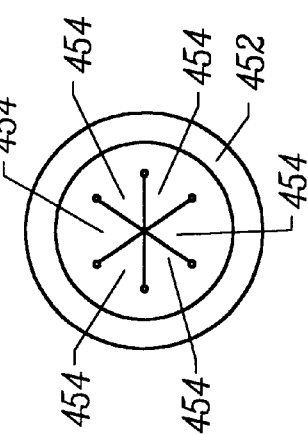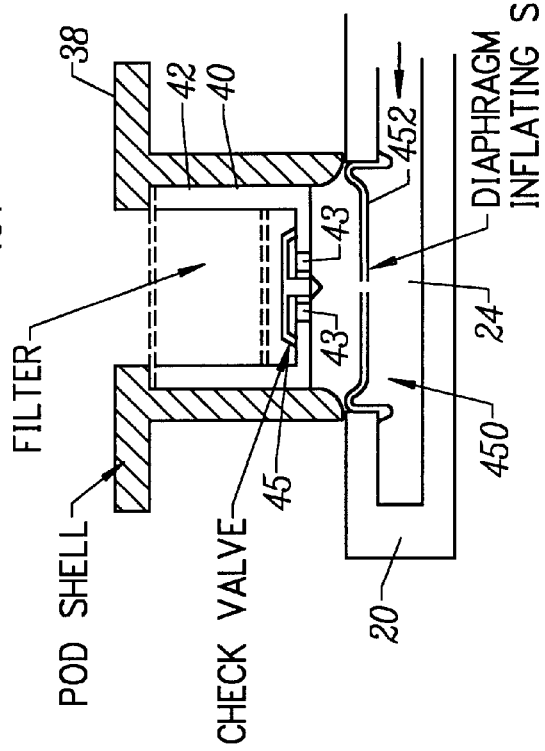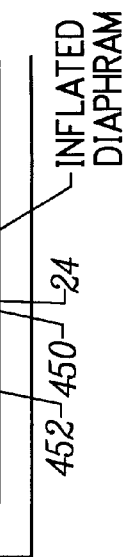

KINEMATIC COUPLING COMPATIBLE PASSIVE INTERFACE SEAL

CROSS REFERENCE TO RELATED APPLICATIONS

The present application is related to the following United States Patent Applications, which applications are owned by the assignee of the present invention and which applications are hereby incorporated by reference in their entirety:

U.S. patent application Ser. No. 09/049,461, entitled "Evacuation-Driven SMIF Pod Purge System", filed Mar. 27, 1998, which application is currently pending; and U.S. patent application Ser. No. 09/049,354, entitled "Modular SMIF Pod Breather, Adsorbent, and Purge Cartridges", filed Mar. 27, 1998, which application is currently pending.

BACKGROUND OF THE INVENTION

1. Field of the Invention

The present invention relates to SMIF pods, and more particularly to systems for allowing gas to be controllably injected into and/or removed from the pods.

2. Description of Related Art

A SMIF system proposed by the Hewlett-Packard Company is disclosed in U.S. Pat. Nos. 4,532,970 and 4,534,389. The purpose of a SMIF system is to reduce particle fluxes onto semiconductor wafers during storage and transport of the wafers through the semiconductor fabrication process. This purpose is accomplished, in part, by mechanically ensuring that during storage and transport, the gaseous media (such as air or nitrogen) surrounding the wafers is essentially stationary relative to the wafers, and by ensuring that particles from the ambient environment do not enter the immediate wafer environment.

A SMIF system has three main components: (1) minimum volume, sealed pods used for storing and transporting wafers and/or wafer cassettes; (2) an input/output (I/O) minienvironment located on a semiconductor processing tool to provide a miniature clean space (upon being filled with clean air) in which exposed wafers and/or wafer cassettes may be transferred to and from the interior of the processing tool; and (3) an interface for transferring the wafers and/or wafer cassettes between the SMIF pods and the SMIF minienvironment without exposure of the wafers or cassettes to particulates. Further details of one proposed SMIF system are described in the paper entitled "SMIF: A TECHNOLOGY FOR WAFER CASSETTE TRANSFER IN VLSI MANUFACTURING," by Mihir Parikh and Ulrich Kaempf, *Solid State Technology*, July 1984, pp. 111–115.

Systems of the above type are concerned with particle sizes which range from below 0.02 microns ($\mu$m) to above 200 $\mu$m. Particles with these sizes can be very damaging in semiconductor processing because of the small geometries employed in fabricating semiconductor devices. Typical advanced semiconductor processes today employ geometries which are one-half $\mu$m and under. Unwanted contamination particles which have geometries measuring greater than 0.1 $\mu$m substantially interfere with 1 $\mu$m geometry semiconductor devices. The trend, of course, is to have smaller and smaller semiconductor processing geometries which today in research and development labs approach 0.1 $\mu$m and below. In the future, geometries will become smaller and smaller and hence smaller and smaller contamination particles become of interest.

In practice, a SMIF pod is set down on various support surfaces within a wafer fab, such as for example at a load port to a minienvironment, whereupon interface mechanisms in the load port open the pod door to allow access to the wafers within the pod. Additionally, a pod may be supported at a storage location while awaiting processing at a particular tool. Such storage locations may comprise a local tool buffer in the case of metrology or high throughput tools, or may alternatively comprise a stocker for storing large numbers of pods within a tool bay. A pod may additionally be positioned at a stand-alone purge station.

Whether a tool load port, local tool buffer, stocker or purge station, the support surfaces typically include registration or kinematic pins protruding upward from the support surface. In 200 mm pods, the support surface includes registration pins and guide rails which guide the pod into the proper rotational and translational position with respect to the pins. In 300 mm pods, a bottom surface of the pods includes radially extending grooves for receiving kinematic pins. Once the pod is positioned so that the grooves engage their respective kinematic pins, the grooves settle over the pins to establish six points of contact between the pod and support platform (at the grooves and pins) to kinematically couple the pod to the support platform with fixed and repeatable accuracy. Such a kinematic coupling is for example disclosed in U.S. Pat. No. 5,683,118, entitled "Kinematic Coupling Fluid Couplings and Method", to Slocum, which patent is incorporated by reference herein in its entirety. The size and location of the kinematic pins are standardized so that the pods of various suppliers are compatible with each other. The industry standard for the location and dimensions of the kinematic coupling pins are set by Semiconductor Equipment and Materials International ("SEMI").

Occasionally, it is advantageous to purge a pod of contaminants and/or particulates by creating a current flow through a pod to carry away the contaminants and/or particulates. It may also be beneficial to fill a pod with a non-reactive gas for longer term storage and certain processes. Additionally, it may be advantageous on occasion to provide the pod with a pressure higher or lower than ambient. In order to accomplish such purging, it is known to provide one or more valves within a pod which allow fluid flow to and/or from the interior of the pod. Inlet valves to the pod may be connected to a pressurized gas source to fill the pod with a desired gas, and outlet valves may be connected to a vacuum source to remove gas from the pod. The inlet and outlet valves may be used to purge the pod, including filling the pod with a desired gas, and/or providing a pressure differential within the pod relative to ambient. Such a system is disclosed in U.S. Pat. No. 4,724,874, entitled "Sealable Transportable Container Having a Particle Filtering System", to Parikh et al., which patent is assigned to the owner of the present application, and which patent is hereby incorporated by reference in its entirety. Relative to systems which require opening of the pod for purging, valve systems require less components and space, and in general operate more efficiently.

An interface seal in the form of an elastic member is typically provided between the gas flow pin and valve to ensure a tight fit of the flow pin with respect to the valve. It is important that such interface seals provide a tight fit, and be durable to ensure that the tight fit does not deteriorate with use. A tight seal between the valve and flow line is generally more important at the inlet valve as opposed to the outlet valve. It is important to provide a uniform and controlled purge flow through the pod from the gas injected through the inlet valve. A tight seal is a significant factor in controlling the purge flow. Additionally, the gas injected into the pod, typically nitrogen, can be harmful to fab personnel if released in large quantities, and it is important to provide a tight seal to prevent significant leakage of the gas around the seal and into the fab. It is therefore desirable to provide an effective interface seal at the inlet valve between the pod and the support surface once the pod is loaded onto the support surface.

The outlet holes are connected to a low pressure source and typically include a loose seal, referred to as a proximity seal. Gas which is forced out of the pressurized pod through the outlet is drawn away by the low pressure source so that it does not escape to ambient. To the extent that the low pressure source attempts to pull a greater volume of gas than is escaping from the pod, the proximity seal allows ambient air to be drawn around the seal, thus ensuring that the negative pressure source does not create a negative pressure within the pod.

In conventional valve systems, the interface seal is established in general as a result of a weight of pod downward, and a force of interface seal and pressurized gas upward. The interface seal has to be relatively rigid to exert the necessary counterforce upward against the weight of the pod. However, the problem with such conventional interfaces is that the downward force of the weight of the pod has to be precisely matched to the upward force of the rigid interface in response to the weight of the pod. Where the upward force of the interface is not enough to match the downward force of the pod, the pod seats on the kinematic pins without establishing a tight seal at the interface. On the other hand, where the upward force of the interface is large relative to the downward force of the pod, the interface seal interferes with a clean seating of the pod on the kinematic pins. Moreover, the weight of the pod on the seal tends to wear down the rigidity of the seal over time. Further still, the flow rate of the incoming gas may vary, thus varying the upward force of the gas against the pod. These factors further complicate the problem of matching the upward and downward forces of the pod and interface seal.

Another problem with current valve interface systems relates to the angle at which a pod is loaded onto the support surface. As explained above, in 200 mm SMIF systems, the support surface includes guide rails which position and orient the pod with respect to the registration pins. Thus, the registration holes in 200 mm pods are positioned directly over the pins before the pod is lowered down onto the pins. In 200 mm SMIF systems therefore, the valve on the bottom of 200 mm pods is similarly brought straight down on top of the gas flow pins, and there is no danger of the pod bottom catching on the gas flow pins and/or interface seal, which catching may otherwise occur if the pod were brought down on the support surface from an angled approach.

However, it is a feature of 300 mm pods that the kinematic coupling may be easily established substantially regardless of the approach angle of the pod with respect to the support surface. Once the pod has settled onto the kinematic pins in a six-point contact, the pod is in a fixed, precise and repeatable position on the support surface. However, due in part to the flexibility of the approach angle, when a pod initially engages the support surface, the flat bottom of the pod or one of the sloped surfaces of the grooves may engage any of the pins before the six-point contact is established. Thus, after initial contact, the pod may be positioned at a wide variety of angles with respect to the support surface. It is from these wide variety of initial angles that the pod settles over the pins, and the valves settle over the inlet and outlet valves in the desired positions.

In conventional purge systems, the gas flow lines from the positive pressure source terminate at the support surface at hollow flow pins that protrude above the support surface, which pins are received in the inlet valves when the pod is seated on the kinematic pins. However, as explained above, the initial engagement angle of a 300 mm pod with respect to the support surface may vary significantly, anywhere from approximately 0° to 90°, and conventional flow pins and/or interface seals may catch on the pod at lower engagement angles. This may interfere with the kinematic coupling, and cause wear to the seal over time.

In an attempt to solve the problem of pod loading, it is known to provide "active" gas flow pins within the support surface. Active pins are those which are initially retracted below the support surface to allow the pod to be loaded onto the support surface from any angle. Thereafter, the gas flow pins may be raised upward into engagement with the gas flow valves. Such active systems require additional components and require additional controls to ensure that the components are raised and lowered in the proper fashion and at the proper time. Additionally, such active systems disadvantageously exert upward forces on the pod which may interfere with the kinematic coupling as described above.

SUMMARY OF THE INVENTION

It is therefore an advantage of the present invention to provide an improved interface between a gas flow line in a support surface and a flow valve on a bottom of a pod.

It is a further advantage of the present invention to provide an interface seal between a gas flow line and a valve which is compatible with kinematic couplings and allows a pod to be loaded onto or removed from a support surface from any angle without interference.

It is a further advantage of the present invention to provide an interface seal between a gas flow line and valve which does not interfere with the kinematic coupling between the pod and support surface.

It is another advantage of the present invention not to rely on the weight of the pod and rigidity of the interface seal to establish a tight seal.

It is a further advantage of the present invention to provide a passive interface seal which does not require actuated or controlled components.

It is a still further advantage of the present invention to provide a simple, reliable, and robust interface seal for preventing leakage of gas between the pod and the support surface around the seal.

These and other advantages are accomplished by the present invention which relates in general to an interface system between a gas flow line within a support surface for a pod and a flow valve mounted within the pod. The interface according to the various embodiments of the invention provides a tight and durable seal between the pod and support surface while at the same time being compatible with kinematic couplings. First, the weight of the pod and the rigidity of the seal are not relied upon to establish the seal. Instead, in embodiments of the invention, the seal is thin and flexible, and expands into engagement with the pod to establish the seal. This type of interface seal will not interfere with the proper seating of the pod on the kinematic pins. Second, in a relaxed state, embodiments of the interface seal extend only a small distance above the support surface, and have no edges that are capable of catching on the pod as the pod is loaded or removed at low angles.

The kinematic coupling between a pod and support surface aligns a pair of inlet and outlet valves on a bottom surface of the pod with a corresponding pair of inlet and outlet holes in the support surface, through which gas may be injected into and removed from the pod, respectively. In one embodiment of the present invention, the interface seal comprises a hollow, annular grommet mounted around the inlet hole. The grommet is thin and includes a plurality of bends which give the grommet flexibility in both the vertical and lateral directions. As explained, the flexibility in the vertical direction prevents the grommet from interfering with the kinematic coupling of the pod on the support surface. The lateral flexibility allows a tight seal even where the pod engages the seal before it is fully seated on the kinematic pins. The vertical and lateral flexibility further reduces wear to the seal which would otherwise occur upon contact between the pod and a rigid seal.

When a pod is seated on the kinematic pins in the support surface, the interface seal according to the present invention preferably lies in light contact with the bottom of the pod at the inlet and outlet valves. Once a pod is seated on the support surface, gas is injected through the inlet hole which creates a positive pressure within the pod and interior of the grommet. The grommet expands as a result of this positive pressure, which extends the grommet upward and radially outward to form a seal that substantially prevents leakage between the pod and support surface around the seal. Various other embodiments of interface seals are also disclosed.

BRIEF DESCRIPTION OF THE DRAWINGS

The invention will now be described with reference to the drawings, in which:

FIG. 7A is a side view of a pod seated on a support surface including an interface seal according to a sixth embodiment of the present invention;

FIG. 7B is a side view of the interface shown in FIG. 7A in an inflated position;

FIG. 7C is a top view of the interface shown in FIG. 7A with a low volume of gas passing through the interface;

FIG. 7D is a top view of the interface shown in FIG. 7A with a high volume of gas passing through the interface;

DETAILED DESCRIPTION

The invention will now be described with reference to FIGS. 1–8B, which in general relate to various embodiments of an improved interface seal for providing a tight and durable seal between a gas flow line and a fluid flow valve to thereby allow gas to be injected into or drawn out of a SMIF pod. It is understood that the interface seals according to the present invention may be used with pods of various sizes including 200 mm and 300 mm pods. Morever, the interface seal according to the present invention complies with and allows compliance with all relevant SEMI standards.

Figure 1:
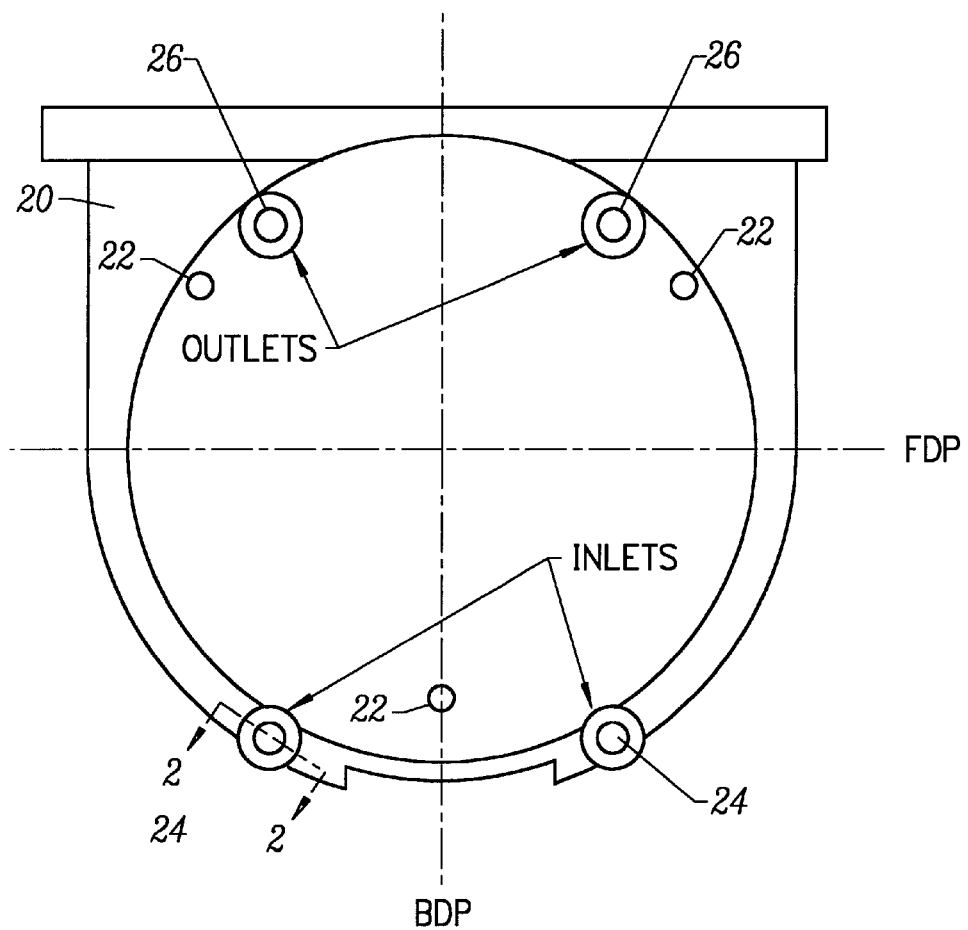
FIG. 1 is a top view of a support surface for supporting a pod including inlets for allowing gas to be injected into the pod, and outlets for allowing gas to be evacuated from the pod.

Referring now to FIG. 1, there is shown a top view of a support surface 20 for supporting a SMIF pod (not shown in FIG. 1). The support surface 20 may comprise any of various surfaces within a wafer fab provided for supporting a pod. Such surfaces include but are not limited to tool load ports, pod shelves within local tool buffers and stockers, and pod support platforms within standalone purge stations.

Support surface 20 includes a plurality of kinematic pins 22 for mounting within corresponding grooves on the bottom of a pod to establish a kinematic coupling between the pod and support surface. Pins 22 may alternatively comprise registration pins for receiving a 200 mm pod. The support surface 20 further includes a pair of inlet holes 24 provided down through the support surface and connecting to a respective pair of gas flow lines. The gas flow lines from the inlet holes are in turn connected to a pressurized gas source, so that gas may be injected into the pod through the inlet holes 24. Support surface 20 further includes a pair of outlet holes 26 provided down through the support surface and connecting to a pair of gas flow lines. The gas flow lines from the outlet holes are in turn connected to a vacuum source, so that gas may be drawn away from the pod through the outlet holes 26. As described hereinafter, the inlet and/or outlet hole(s) may further include a pin mounted in and extending out of the hole(s) for actuating a particular type of valve.

In a preferred embodiment, inlet holes 24 are located at a rear of the support platform, and outlet holes 26 are located at a front of the platform. Thus, when a pod is located on the support platform, inlet holes 24 will be located under a rear of the pod, and outlet holes 26 will be located under a front of the pod. With such a configuration, a purging flow through the pod may occur from a rear of the pod forward. This is advantageous in part because the pods are more narrow at the rear of the pod, and the spreading of the injected gas naturally follows the contour of the pod as the gas flows toward the front of the pod. It is additionally advantageous to purge from the rear in cases where the pod door in a front opening pod is removed. Such a system promotes flow across the entire volume of the pod, and prevents particulates and/or contaminants from the adjacent process tool and/or minienvironment from entering the pod. Thus, the disclosed orientation of the inlet and outlet holes promotes even purge flow through the pod and minimizes purge times. It is understood that the number and position of inlet and outlet holes within the support surface 20 may vary in alternative embodiments of the invention. Moreover, it is understood that a single hole may function as both an inlet and an outlet for gas flow with respect to a pod located on the support surface. In such an embodiment, the inlet flow may alternate with the outlet flow.

Figure 2:
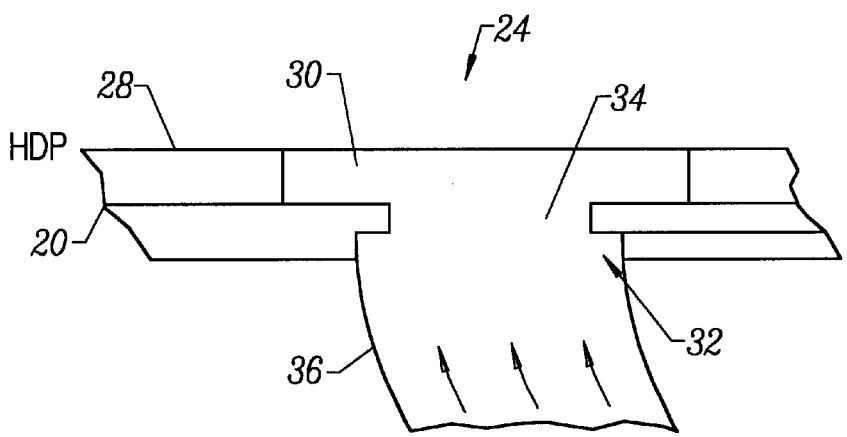
FIG. 2 is a cross-sectional side view through line 2—2 in FIG. 1.

A preferred configuration of holes 24 and 26 is shown in the side view of FIG. 2. Although FIG. 2 is a cross-sectional view of an inlet hole 24, it is understood that the outlet holes 26 preferably have a similar cross-section. The configuration of the inlet and outlet holes may vary in alternative embodiments. Support surface 20 includes an upper surface 28 from which the kinematic pins 22 extend. Hole 24 (and 26) within the surface 20 preferably comprise a first annular countersunk portion 30 extending down from upper surface 28 through a portion of the support surface 20, and a second annular countersunk portion 32 extending partially upward from a bottom surface of support surface 20. The first and second annular countersunk portions 30 and 32 are separated by boundary region 34 of a smaller diameter than portions 30 and 32. In an embodiment of the invention, the first countersunk portion 30 may have a diameter of 30 mm or greater, the second countersunk portion 32 may have a diameter of 20 mm or greater, and the boundary region 34 may have a diameter of approximately 15 mm. It is understood that these diameters may vary in alternative embodiments of the invention. Additionally, it is understood that the cross-sectional configuration of holes 24 and 26 may vary in alternative embodiments. An inlet gas line 36 is shown affixed to a lower portion of the support surface for supplying gas through inlet hole 24. It is understood that a similar gas line is connected to the support surface 20 at the outlet holes 26 for drawing gas through the holes 26.

Referring now to FIGS. 3A–7D, there is shown a portion of a bottom surface of a pod 21 defining an annular well 40 in which a valve 42 may be mounted. Valve 42 may comprise a check valve which allows fluid flow in one direction. Thus, where a valve 42 is located over an inlet hole 24, the check valve 42 allows gas flow into the pod 21. Conversely, where a valve 42 is located over an outlet hole 26, the valve allows gas flow out of the pod 21. A first type of valve is shown in FIGS. 3A–4B, 7A–7B and 8A–8B. This type of check valve comprises one or more holes 43 through which the gas may enter the valve. Gas entering through the inlet forces the edges of a cap 45 upward away from a bottom surface of the check valve to thereby allow gas through the valve. Pressure on a top side of a cap 45 will merely press the cap into tighter engagement with the bottom surface of the valve to thereby block fluid flow in that direction. Another type of check valve which may be used in the present invention is shown in FIGS. 5A–5C and 6A–6C. This type of valve is disclosed in U.S. Pat. No. 4,129,145 to Wynn, issued Dec. 12, 1978 and entitled "Check Valve Assembly", which reference is hereby incorporated herein in its entirety.

It is however understood that the type of valve employed is not critical to the present invention and that either of the shown valves may be used with any of the interface seal embodiments described hereinafter. It is further understood that the type of valve used may vary significantly in alternative embodiments of the invention. Moreover, it may occasionally be advantageous to completely block off fluid flow to or from a valve. In this case, well 40 may include a plug instead of a valve. Although not critical, the pods and valves used in accordance with the present invention are preferably modular so that a valve 42 may be removed from well 40 and replaced by a different type of valve as desired. Such a system is described in greater detail in U.S. patent application Ser. No. 049,354, previously incorporated by reference. The inlet and outlet holes may additionally include a filter 44 of known construction for filtering the gas flowing into and out of the pod 21. The filter 44 may be used with or without a valve 42. The well 40 and interface seals are preferably of small diameter to minimize the surface area in the pod and seal which can collect particulates and/or contaminants.

The various embodiments of the interface seal between the inlet or outlet holes and valves 42 will now be described with respect to FIGS. 3A–7D. It is a feature of the interface seals according to the present invention that they are compatible with kinematic couplings. In particular, the interface seal may establish a tight and durable seal at the inlet and/or outlet without having to use conventional fluid flow pins extending above the support surface. The omission of the flow pins, as well as the general low profile of the interface seals, allow a pod 21 to be loaded onto or removed from the support surface 20 from angles ranging approximately between the horizontal and vertical without the pod catching on the flow pins or interface seal. Moreover, the present system does not employ any active interface systems with actuated parts. Such passive interfaces are in general more simple and inexpensive to manufacture, and less likely to malfunction over time.

As indicated in the Background of the Invention section, it is more critical to establish a tight seal at the inlet valve to prevent leakage of injected gas around the seal and into the fab. For this reason, the various embodiments of the interface seal set forth hereinafter are generally explained with respect to an inlet to the pod. A proximity seal of known construction may be provided at the outlet valve. However, various embodiments of the interface seal may also be used at the outlet valve as indicated below.

First Embodiment Of The Interface Seal

Figure 3A:
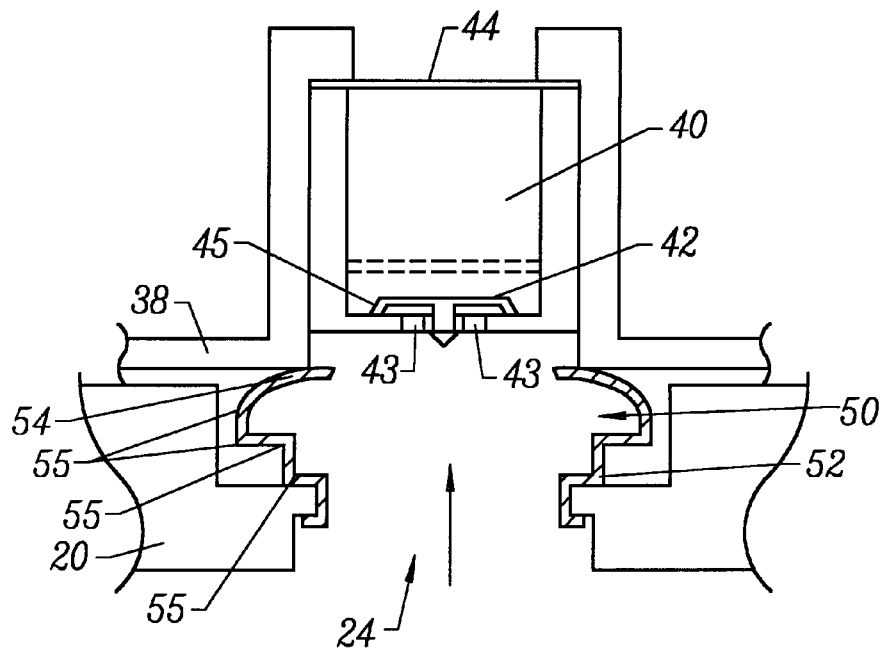
FIGS. 3A and 3B are side views of a pod on a support surface including an interface seal according to a first embodiment of the present invention.

An interface seal 50 according to a first embodiment of the present invention will now be described with specific reference to FIGS. 3A–3B. The interface 50 includes a grommet 52 mounted within inlet hole 24. The grommet is preferably annular in shape, with a hollow center through which the gas may flow, and is preferably formed of an elastomeric material such as for example Viton™ or various other low durometer fluoroelastomers. Grommet 52 has a cross-sectional shape (viewed from above) to match the shape of well 40. As explained hereinafter, grommet 52 may additionally be used in the outlet hole 26. As set forth in the Background of the Invention section, conventional interface seals relied on the weight of the pod and a rigidity of the interface to establish a tight seal. It is a feature of the present invention that the weight of the pod and rigidity of the seal are not relied upon to establish the seal. In particular, grommet 52 includes an upper portion defining a dome 54 with a hole in its center. In its relaxed state, the dome 54 is slightly above or even with the top surface of support surface 20. The pod, once fully seated on the kinematic pins, preferably lies in light engagement with the upper surface of the dome 54. Grommet 52 is preferably thin, on the order of approximately 20 to 40 mils, and includes a plurality of bends 55. The thickness of the grommet together with the bends 55 make grommet 52 flexible so that the grommet 52 does not interfere with the kinematic coupling even where the pod engages the grommet upon seating on the kinematic pins. Moreover, as the interface seal does not support the weight of the pod, the interface seal according to the present invention will have less wear over time in comparison to conventional interface seals.

The shape of dome 54, together with the fact that the grommet extends only a slight distance above surface 20, allows a pod to be lowered onto the support surface from low angles without the pod catching on the grommet 52. It is possible that the pod may engage the grommet 52 when approaching from higher angles. In the event the pod engages the grommet 52 while it is being loaded onto the support surface, the bends 55 allow the grommet to move flexibly in the lateral direction (which lateral movement will be slight owing to the small lateral component of movement of the pod when approaching from higher angles). The lateral flexibility of grommet 52 upon such engagement allows grommet 52 to form a tight seal (as explained hereinafter) even where the pod seats on the grommet with the grommet slightly off-center. Additionally, the lateral and vertical flexibility of the grommet reduces wear to the interface, which wear would otherwise occur as a result of engagement of a pod bottom with a rigid gasket upon approach of the pod to the support surface.

Figure 3B:
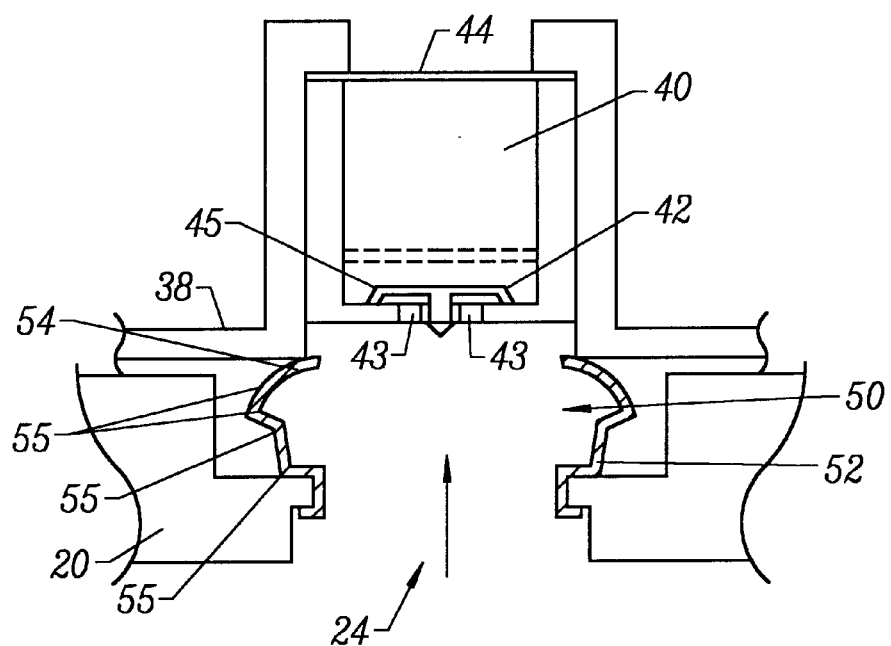

As shown in FIG. 3B, once the pod is properly loaded onto the support surface 20, and gas is injected through inlet opening 24, pressure within the pod as well as within an interior of the grommet will increase such that the grommet will expand. Expansion of the grommet will flatten bends 55 and move the dome 54 upward and/or outward into sealing engagement with the pod. Thus, the grommet 52 within hole 24 is passively activated entirely by the gas flow through the inlet valve. It is a further feature of the grommet that for higher purge flow rates, the grommet will expand to a greater extent, thereby establishing an even tighter seal. However, even upon high flow rates and large grommet expansion, the interface 50 will not interfere with the kinematic coupling.

Upon an increase in pressure and expansion of grommet 52, the inlet flow and bends 55 accomplish two functions. First, it is on occasion necessary to adjust the height of the kinematic pins 22 to adjust the position of a pod on the support surface. When the height of one or more of the kinematic pins 22 is adjusted, this may change the height of the sidewalls of well 40 over the support surface, and a slight space may exist between the grommet m a relaxed state and the pod when properly seated on the pins. However, any space that may exist is small, and the flow of gas through such a space will be smaller than the flow of gas through the inlet hole 24. Thus, upon introduction of the inlet pressure, the grommet will expand and rise upward as described above to form the seal. The amount that the grommet rises upward will vary depending on the spacing between the pod bottom and support surface. Thus, interface 50 is capable of self-adjusting its height to engage the pod and seal off the valve.

In addition to moving vertically upward to adjust to the height of the pod over the support surface, a second function accomplished by the inlet gas and bends 55 is that the dome 54 expands radially outward to thereby exert a horizontal force on the sidewalls of the well, thereby further improving the seal.

As described above, the embodiments of the interface seal according to the present invention will generally be provided to form a seal at the inlet valve. The outlet valve may include a conventional proximity seal. In embodiments of the invention, outlet hole 26 may alternatively include a grommet 52 identical to that within the inlet hole. However, the grommet in the outlet hole is drawn into engagement with the pod under different conditions than those which exist at the inlet. The shape of the grommet 52 together with the evacuation pressure create an area of localized low pressure immediately above the grommet 52 at the outlet hole. This localized low pressure pulls the grommet into sealing engagement with the pod 21. Thus, the interface seal 50 is capable of forming a seal at both the inlet and outlet valves.

Second Embodiment Of The Interface Seal

Figure 4A:
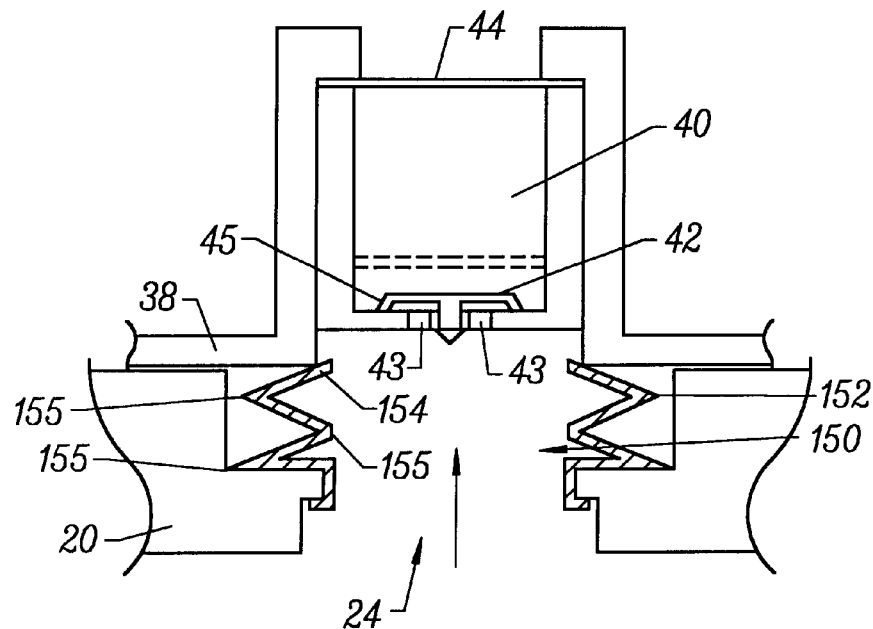
FIGS. 4A and 4B are side views of a pod resting on a support surface including an interface seal according to a second embodiment of the present invention.

An interface seal 150 according to a second embodiment of the present invention will now be described with specific reference to FIGS. 4A and 4B. Interface 150 comprises an annular bellows 152 mounted within the inlet hole 24. The bellows 152 is preferably formed of an elastomer, such as for example Viton™ or various other low durometer fluoroelastomers, and includes an opening through the center through which the inlet gas may flow.

While bellows 152 has a slightly different configuration than grommet 52, bellows 152 functions in a similar fashion to grommet 52 to seal the valve against the surrounding atmosphere. In particular, in its relaxed state, a top portion 154 of bellows 152 lies slightly above or even with the top surface of support surface 20. The pod, once fully seated on the kinematic pins, preferably lies in light engagement with the upper surface of the bellows 152. Bellows 152 is preferably thin, on the order of approximately 20 to 40 mils, and includes a plurality of bends 155. The thickness of the bellows together with the bends 155 make bellows 152 flexible, and bellows 152 does not interfere with the kinematic coupling even where the pod engages the bellows upon initial contact of the pod with the kinematic pins.

The shape of top portion 154, together with the fact that the bellows extends only a slight distance above surface 20, allows a pod to be lowered onto the support surface from any angle between the vertical and horizontal without the pod catching on any portion of the bellows 152. In the event the pod engages the bellows 152 while it is being loaded onto the support surface, the bends 155 allow the bellows to move flexibly in the lateral direction to form a tight seal even where the pod seats on the pins with the bellows slightly off-center. Additionally, the lateral and vertical flexibility of the bellows reduces wear to the interface.

Figure 4B:
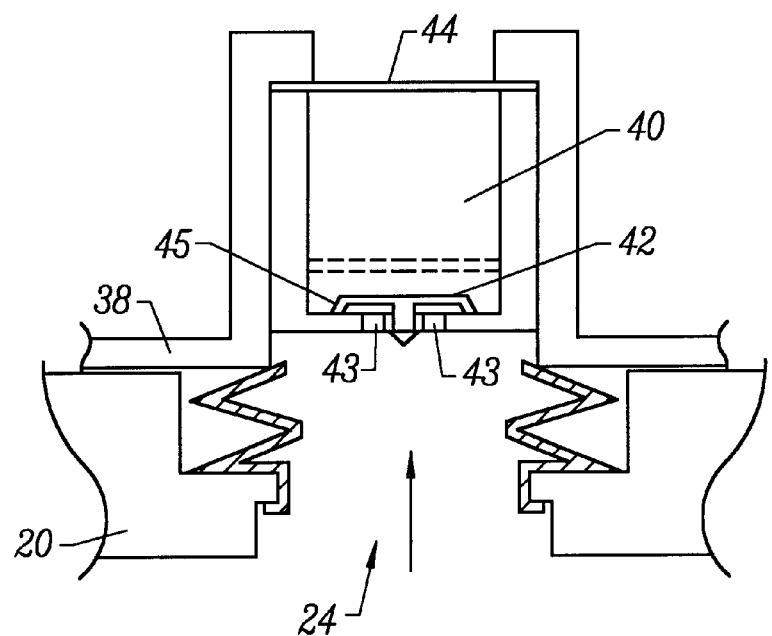

As shown in FIG. 4B, once the pod is properly loaded onto the support surface 20, and gas is injected through inlet opening 24, pressure within the pod as well as within an interior of the bellows will increase such that the bellows will expand. Expansion of the bellows will flatten bends 155 and move the top portion 154 upward and/or outward into sealing engagement with the pod. At higher purge flow rates, the bellows will expand to a greater extent, thereby establishing an even tighter seal. However, even upon high flow rates and large bellows expansion, the interface 150 will not interfere with the kinematic coupling.

As with grommet 52, the bends 155 in bellows 152 provide two functions upon an increase in pressure and expansion of bellows 152. First, the bellows 152 is capable of self-adjusting its height to account for variations in pod-support surface spacing, to thus engage the pod and seal off the valve. Second, the top portion 154 expands radially outward to thereby exert a horizontal force on the sidewalls of the well, thereby further improving the seal.

Outlet hole 26 may include a conventional proximity seal or bellows 152. In embodiments where the hole 26 includes a bellows 152, the bellows 152 is pulled into engagement with the pod due to the localized negative pressure above the bellows 152. Thus, the interface seal 150 is capable of forming a seal at both the inlet and outlet valves.

Third Embodiment Of The Interface Seal

An interface seal 250 according to a third embodiment of the present invention will now be described with specific reference to FIGS. 5A–5D. Interface 250 comprises an annular gasket 252 affixed within hole 24 in the support surface 20, preferably extending approximately ⅛ inch above the support surface 20. This height may however vary in alternative embodiments. It is further understood that the shape of gasket 252 may vary in alternative embodiments with the provision that the cross-sectional area (viewed from the top) of gasket 252 match the shape of the side walls defining well 40.

The outer surface of gasket 252 is frustoconically shaped, preferably angling inward at an angle of approximately 45° or less with respect to support surface 20. It is understood that the angle that the outer surface of gasket 252 forms with the surface 20 may vary in alternative embodiments of the invention. Gasket 252 is preferably formed of an elastomeric material such as Viton™ or various other low durometer flouroelastomers. The shape and composition of gasket 252 allow low angle approach of pod 21 onto the support surface 20 without any surfaces of the pod catching on the gasket. In the event that the pod 21 engages the gasket 252 before the pod is fully seated on the support surface, the gasket will elastically deform, and return to its original shape when the pod is properly seated thereon. Such a configuration ensures a tight fit between the walls of well 40 and the support surface, thereby preventing leakage of gas around the interface seal.

Figure 5A:
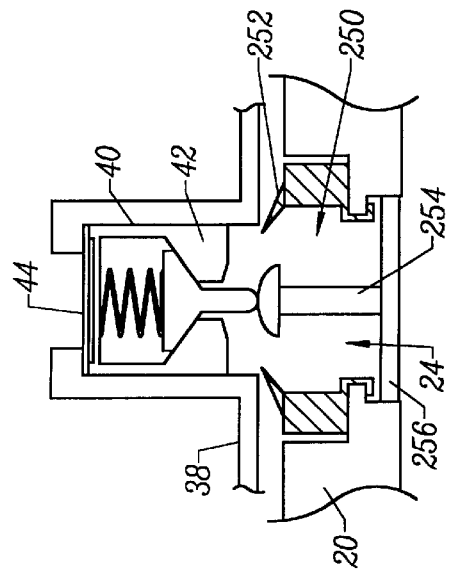
FIGS. 5A–5C are side views of a pod being loaded onto a support surface including an interface seal according to a third embodiment of the present invention.
Figure 5C:
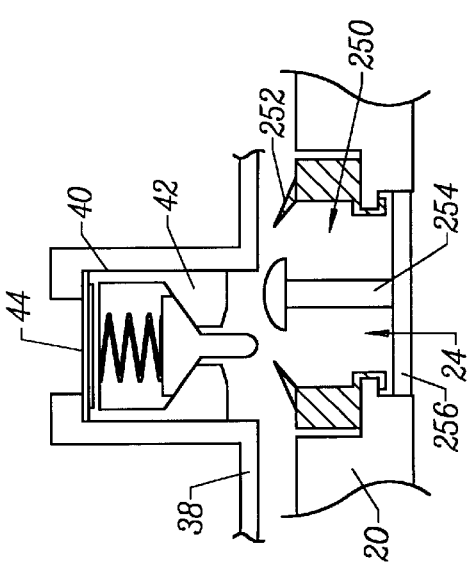
Figure 5B:
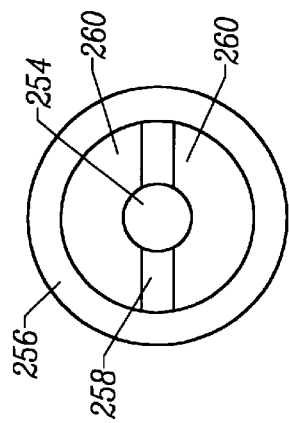
Figure 5D:
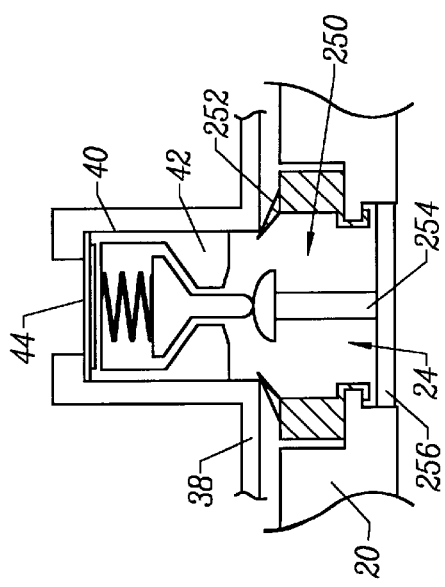
FIG. 5D is a top view of an interface seal as shown in FIG. 5A.

FIGS. 5A–5D show an inlet assembly where gas flows from an inlet hole 24 through valve 42 and into the pod 21. In order to open the valve 42, a pin 254 is mounted through the hole 24 and extending upward. As shown in FIG. 5D, the pin 254 is mounted within hole 24 by a ring 256 and support 258 so that gas may flow through spaces 260 up through the hole 24. Pin 254 preferably extends approximately ⅛ inch above the support surface 20 so as to engage a plunger of valve 42 when the pod is seated on top of the support surface, to thereby open a flow path through the valve 42 (FIG. 5C). The pin 254 may be formed of a low friction material such as for example delrin™. In an alternative embodiment of the interface seal 250, pin 254 may be omitted. In this embodiment, the pressure of the incoming gas through inlet hole 24 may force the check valve 42 to open to allow the flow of fluid through the valve and into the pod 21.

It is further understood that the pin 254 and valve 40 described with respect to FIGS. 5A–5D may be used with the interface seals described above with respect to the first and second embodiments shown in FIGS. 3A to 4B. Additionally, the third embodiment described with respect to FIGS. 5A–5D may be used with a valve 42 shown in FIGS. 3A–4B.

The outlet hole 26 in this embodiment may additionally include an interface 250 as described above with respect to the inlet hole 24. The pin 254 may be omitted from the interface 250 in the outlet hole, and the valve 42 in the outlet hole may be opened as a result of a high pressure within the pod 21 and/or a low pressure at the outlet hole 26. Outlet hole 26 may alternatively include a proximity seal of known construction.

Fourth Embodiment Of The Interface Seal

An interface seal 350 according to a fourth embodiment will now be described specifically with reference to FIGS. 6A–6C. Interface 350 comprises an annular gasket 352 formed of an elastomeric material such as Viton™ or various other low durometer flouroelastomers. The gasket 352 operates similarly to the interface 250 of FIGS. 5A–5D, with the exception that gasket 352 is attached to the pod 21 instead of being mounted on the support surface 20. As in FIGS. 5A–5D, the interface 350 allows a pod to approach support surface 20 at a lower angle without interference.

The inlet hole 24 in the fourth embodiment preferably includes a plug 353 substantially filling the hole 24. The plug 353 includes a bump 354 on an upper surface of the plug. Gas passages 355 are further provided through the plug 353 and bump 355, with the passages 355 branching into a plurality of passages through the bump 355. As the pod 21 approaches support surface 20, the gasket 352 will seat down over bump 354. Once the pod 21 is seated on the support surface 20, the bump 355 engages a plunger in the valve to thereby open the valve as shown in FIG. 6B. As indicated in FIG. 6C, the gas passages through the bump are located radially outward of the central portion of the bump which engages the plunger. Thus, gas may flow through the passages in the bump and through the valve when the bump engages the plunger. It is understood that various other configurations of the bump and gas passages are contemplated.

Figure 6B:
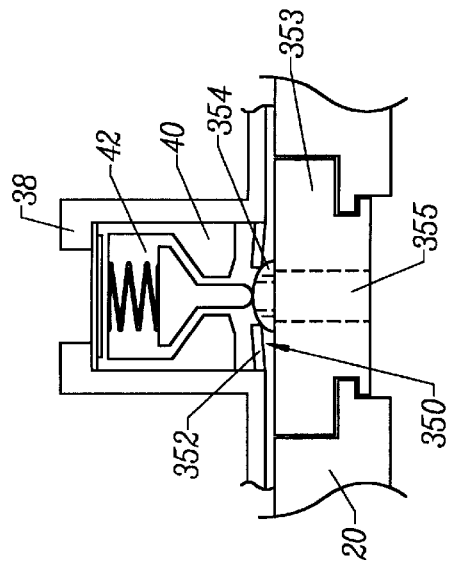
FIGS. 6A and 6B are side views of a pod being loaded onto a support surface including an interface seal according to a fourth embodiment of the present invention.

When the pod is properly located on the support surface as shown in FIG. 6B, the bump 354 and gas passages 355 seat within an open center of the gasket 352. Gasket 352 forms a seal around the valve and bump 354 to substantially prevent leakage of gas between the gasket 352 and bump 354. Moreover, it is a feature of this embodiment of the interface seal 350 that, as gas flows into the pod 21 and pressure within the pod increases, the gasket 352 will be forced downward around the sides of bump 354. Thus, as the pressure within pod 21 increases, the seal provided by interface 350 becomes tighter.

Figure 6D:
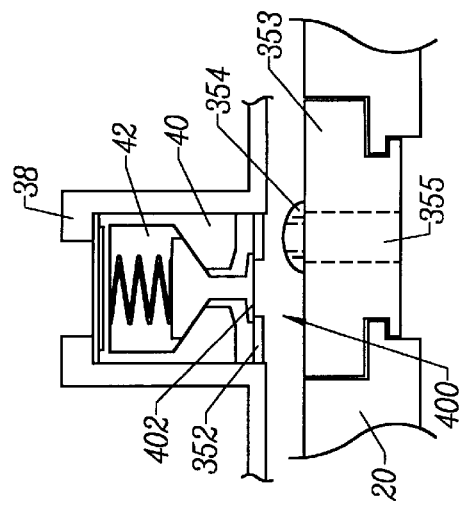
FIG. 6D is a side view of a pod being loaded onto a support surface including an interface seal according to a fifth embodiment of the present invention.
Figure 6A:
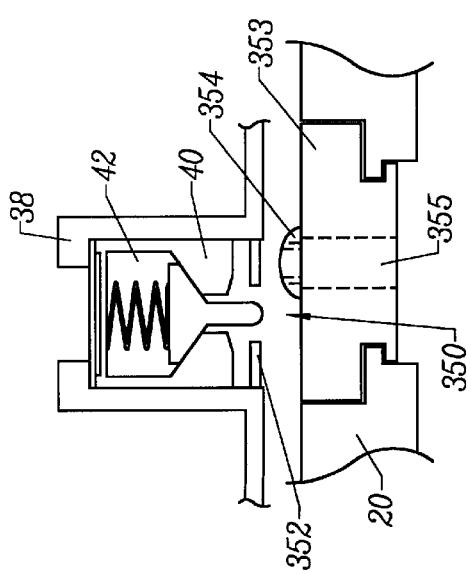
Figure 6C:
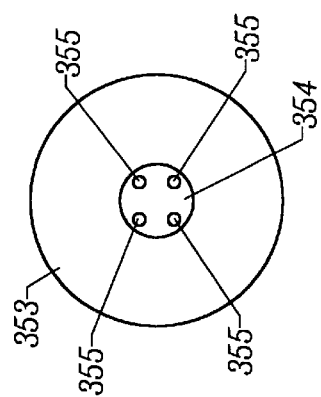
FIG. 6C is a top view of the inlet hole utilized in the fourth embodiment of the invention.

The assembly shown in FIGS. 6A–6C represents an inlet assembly. However, the gasket 352 may similarly be used at an outlet assembly where gas flows out of pod 21 and through one or more holes 26. At the outlet valve, the relatively high pressure inside the pod and/or the relatively low pressure through hole 26 will activate the valve 42. However, such a bump may be provided so that any positive pressure behind the seal formed by gasket 352 will force the gasket 352 downward over such a bump to thereby tighten the seal as described above. As above, where an interface seal 350 is provided at the outlet hole 26, a plug 353 may be provided in the outlet hole 26 so that gas from the pod flows through the gas passages 355 and away through the low pressure gas flow lines.

Fifth Embodiment Of The Interface Seal

An interface seal 400 according to a fifth embodiment of the present invention will now be described with reference to FIG. 6D. The seal of FIG. 6D is identical in structure and operation to the interface seal 350 described above with respect to FIGS. 6A–C. However, in this embodiment, the plunger in the valve 42 includes a flange 402. When not engaged on the support surface, the flange lies in contact with an upper surface of gasket 352, thus providing a second seal in valve 42 in addition to engagement of the plunger with the sidewalls of the valve. The second seal acts to prevent particulates, contaminants and/or water from entering through the bottom of the valve. The gasket 352 is sufficiently flexible so that the gasket does not exert forces upward against the plunger in excess of the force of the valve spring biasing the plunger downward. Upon engagement of the actuator 358 against the plunger, the plunger will move upward as explained above with respect to FIGS. 6A through 6C. Upon such movement, the flange 402 will move out of engagement with the gasket 352.

Sixth Embodiment Of The Interface Seal

An interface seal 450 according to a sixth embodiment of the present invention will now be described with reference to FIGS. 7A–7D. The check valve of FIGS. 7A–7D is similar to that disclosed with respect to FIGS. 3A–4B. However, as will be explained hereinafter, a check valve as described with respect to the previous figures may alternatively be used with this embodiment.

Interface seal 450 includes a diaphragm 452 affixed within inlet hole 24. Diaphragm 452 is preferably comprised of an elastomeric material such as for example Viton™ or various other low durometer flouroelastomers. In a relaxed state, the diaphragm normally resides entirely below the upper surface of support surface 20 (FIG. 7A). This facilitates loading of the pod onto the support surface 20 from any approach angle, and prevents wear of the interface seal otherwise due to contact between the interface and lower pod surface upon approach of the pod. Once the pod is seated on the support surface, flow of gas through inlet hole 24 is initiated.

Referring now to FIG. 7B, the incoming gas through inlet hole 24 will force the diaphragm upward into an "inflated" position whereby the edges of the diaphragm contact the sides of well 40 to thereby establish a tight seal between the pod and support plate at the valve 42. It is contemplated that upon inflation, the diaphragm exerts forces on the walls of the well 40, which forces have both vertical and/or horizontal components. The diaphragm 452 may have a greater surface area than that shown in FIG. 7A, so that upon inflation, the diaphragm engages vertical surfaces of the well 40 walls to exert a force radially outward thereon. Such an engagement provides a tight seal, and tends to hold the pod in secure engagement with the support surface.

Diaphragm 452 includes a plurality of flaps 454, the unattached tips of which flaps preferably come together at a central point of the diaphragm. It is understood that other flap configurations are possible in alternative embodiments of the invention. The flaps 454 allow gas flow through the diaphragm 452, while at the same time ensuring that a sufficient pressure will be built up on the underside of the diaphragm to inflate the diaphragm into its sealing position. In particular, the flaps are provided with a sufficient stiffness such that, upon relatively low gas flow rates through the inlet hole, the flaps will separate only a small amount (FIG. 7C) sufficient to allow gas flow through the diaphragm. However, as the flaps resist moving apart from each other, a pressure is built up below the diaphragm sufficient to inflate the diaphragm. Alternatively, as shown in FIG. 7D, for high flow rates, the flaps will separate to a large degree, while still maintaining a pressure below the diaphragm necessary to inflate the diaphragm. In a further embodiment of the invention, the bottom portion of the plunger may be flanged outward and include a central opening. Thus, diaphragm may engage the plunger without the plunger contacting or otherwise engaging the flaps 454 on the diaphragm.

It is a feature of this embodiment of the interface seal that both the interface seal and the flow valve may be actuated entirely by the inlet pressure of the gas. In an alternative embodiment, interface seal 450 may be used with a check valve as described in U.S. Pat. No. 4,129,145 to Wynn, and as shown in FIGS. 5A–5C and 6A–6C. In such an embodiment, the inflated diaphragm itself may contact the plunger of the valve to thereby separate the plunger from the valve seat, and allow gas flow through the valve.

Figure 8A:
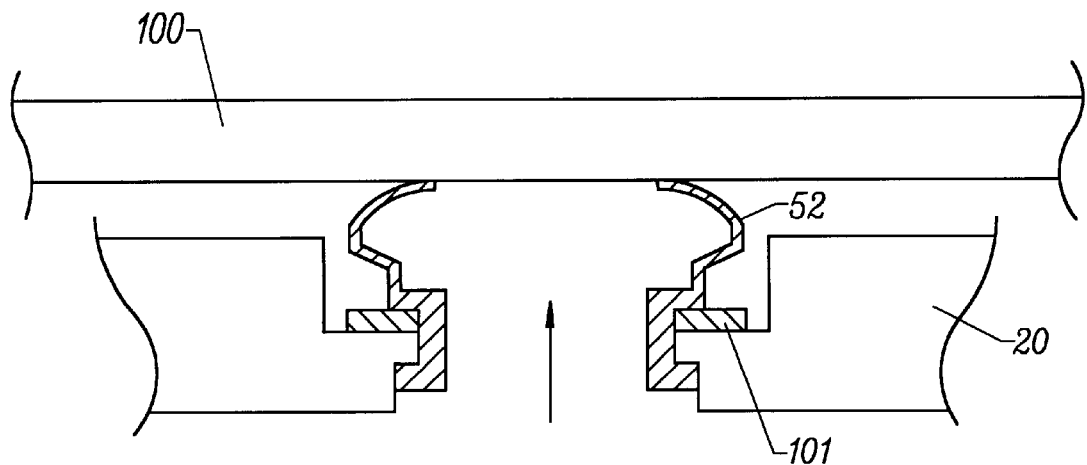
FIG. 8A is a partial side view of a test fixture and mechanism for adjusting the height of an interface seal according to embodiments of the invention.
Figure 8B:
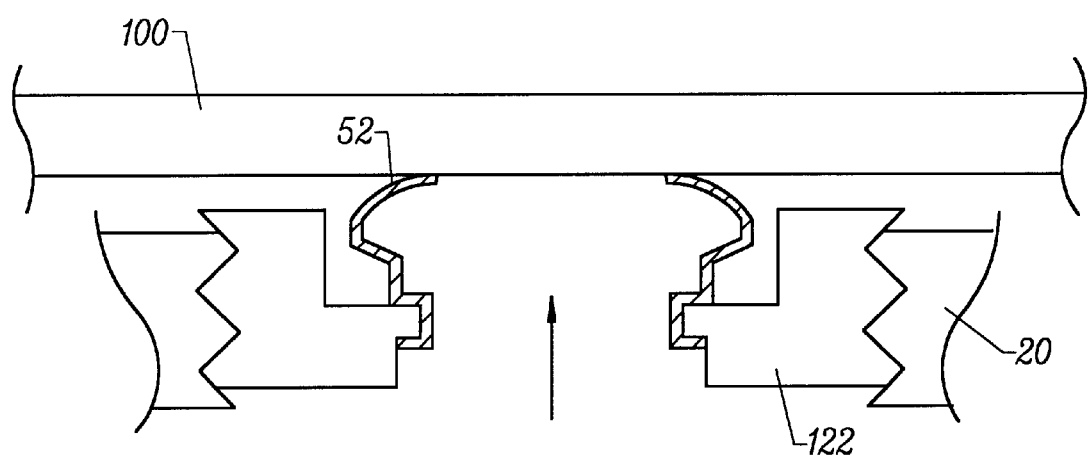
FIG. 8B is a partial side view of a test fixture and mechanism for adjusting the height of an interface seal according to an alternative embodiment of the invention.

Referring now to FIGS. 8A and 8B, as described above, it is occasionally necessary to adjust the height of kinematic pins 22 in support surface 20. It is a further feature of the present invention to provide a system capable of visually checking the engagement of the interface seals described above with a lower surface of the pod, and also to provide a system for adjusting the height of an interface seal in the event that an interface seal needs to be raised or lowered to properly seal the valve.

As shown in FIGS. 8A and 8B, the system for visually checking the integrity of the interface seal comprises a planar plate 100 (only a portion of which is shown in FIGS. 8A and 8B) formed of plexiglass or some other transparent material. Plate 100 has a footprint approximately the same size as a SMIF pod 21, and includes grooves (not shown) for seating on the kinematic pins from the support surface in the same manner as a pod 21. With the plate mounted on the support surface, the bottom surface of the plate 100 is located in the same elevational position as the bottom of a pod on the support surface.

In operation, plate 100 may be located on a support surface including kinematic pins 22 and an embodiment of the interface seal described above. FIGS. 8A and 8B show an embodiment where the interface seal comprises a grommet 52 as described with respect to FIGS. 3A and 3B. However, it is understood that any of the previous interface embodiments may be used. As the plate 100 is transparent, the seal between the lower surface of the plate and the interface seal may be viewed to thus determine if the adjustment of the kinematic pins on the support surface 20 has created a space between the interface seal (in a relaxed state) and the bottom of the plate. Any such a space would similarly exist when a pod was thereafter seated on the support platform.

Once it is determined that the adjustment of the pins has caused a space between the lower surface of the pod and the interface seal, the interface seal may be raised so that the proper engagement between the seal and pod occurs upon seating of the pod on the support surface. One system for raising the interface seal is shown in FIG. 8A. In this embodiment, an annular spacer 101 may be located in the first annular countersunk portion 30 (FIG. 2) within the inlet or outlet holes, under a portion of the interface seal as shown, to stretch the height of the interface seal upward. The interface seal is sufficiently elastic to stretch without creating significant stresses within the interface seal. The thickness of spacer 101 may vary in alternative embodiments, and/or more than one spacer may be used, to raise the interface seal sufficiently to form a light engagement with the bottom of the pod when the pod is located on the support surface. The plate 100 may be used to indicate when the interface seal has been raised sufficiently to establish this light engagement.

It is understood that other methods may be employed for raising or lowering the height of an interface seal with respect to the valve. For example, in an alternative embodiment of FIG. 8B, the interface seal may be mounted in an annular ring 122 having a threaded outer circumference. This threaded outer circumference may mate with a corresponding threaded opening within the support surface 20. In the event that an interface seal does not form a tight seal upon location of the plate 100 thereon, the annular member 122 may be rotated with respect to the support platform 20 to raise or lower the interface seal as needed to form a tight seal. The systems described above in FIGS. 8A and 8B for raising the height of the interface seal may be included in the support surface 20 described with respect to any of the previous interface seal embodiments.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. An interface seal for allowing gas flow between a stationary support surface and a movable pod brought to and supported on the support surface, the interface seal comprising:

a flexible seal within the support surface capable of substantially preventing leakage of gas between the support surface and pod around said flexible seal upon seating of the pod on the support surface and expansion of said flexible seal, wherein said gas flow expands said flexible seal, wherein said flexible seal allows the pod to approach the support surface from an angle between approximately 0° and 90° immediately prior to contact of the pod with the support surface.

2. An interface seal as recited in claim 1, wherein said flexible seal comprises a grommet.

3. An interface seal as recited in claim 1, wherein said flexible seal comprises a bellows.

4. An interface seal as recited in claim 1, wherein upon location of the pod on the support surface, said flexible seal is vertically aligned with an opening in a bottom surface of the pod and, upon said inflation of said flexible seal, said flexible seal exerts a horizontal force on walls defining said opening.

5. An interface seal as recited in claim 4, wherein said flexible seal includes at least one slit therein, said at least one slit capable of admitting a variable flow of gas therethrough upon said inflation of said flexible seal.

6. An interface seal as recited in claim 1, wherein said flexible seal comprises an elastomeric material.

7. An interface seal as recited in claim 1, wherein the pod comprises a standard mechanical interface pod.

8. A system for passing a gas from a remote source through a SMIF pod, the SMIF pod being removably supported on at least one support structure extending up from a support surface, the pod including an inlet valve through which gas passes from the support surface into the pod, the inlet valve including a plunger biased into contact with sidewalls of the inlet valve to prevent a flow of gas through the inlet valve, the system comprising:

a pin mounted in an opening in the support surface, gas passing from the remote source through said opening, said pin biasing the plunger away from the sidewalls of the inlet valve to thereupon allow the flow of gas through the inlet valve; and a flexible seal mounted at least partially within said opening, said flexible seal capable of substantially preventing leakage of gas between the support surface and the inlet valve around said flexible seal upon seating of the pod on the at least one support structure and expansion of said flexible seal, wherein a flow of the gas from the support surface into the pod expands said flexible seal.

9. A system for passing a gas through a SMIF pod as recited in claim 8, wherein said flexible seal allows the pod to approach the at least one support structure from an angle between approximately 0° and 90° immediately prior to contact of the pod with the at least one support structure.

10. A system for passing a gas through a SMIF pod as recited in claim 8, wherein said flexible seal comprises a grommet.

11. A system for passing a gas through a SMIF pod as recited in claim 8, wherein said flexible seal comprises a bellows.

12. A system for passing a gas through a SMIF pod as recited in claim 8, wherein upon location of the pod on the support surface, said flexible seal is vertically aligned with an opening in a bottom surface of the pod and, upon said inflation of said flexible seal, said flexible seal exerts a horizontal force on walls defining said opening.

13. A system for passing a gas through a SMIF pod as recited in claim 12, wherein said flexible seal includes at least one slit therein, said at least one slit capable of admitting a variable flow of gas therethrough upon said inflation of said flexible seal.

14. A system for passing a gas through a SMIF pod as recited in claim 8, wherein said flexible seal comprises an elastomeric material.

15. A system for passing a gas through a SMIF pod as recited in claim 8, wherein the pod comprises a standard mechanical interface pod.

16. A system for passing a gas through a SMIF pod as recited in claim 8, wherein a height of said interface seal above a upper surface of the support surface may be adjusted to compensate for a variance in a height of the at least one support structure above said upper surface.

17. A system for passing a gas through a SMIF pod as recited in claim 16, further comprising a transparent plate capable of seating on the at least one support structure, said transparent plate providing a visual indication of a spacing between an upper edge of said interface seal and a bottom surface of said transparent plate when said flexible seal is inflated and prior to said adjustment of said interface seal.

18. A system for passing a gas from a remote source through a SMIF pod, the SMIF pod being removably supported on at least one support structure extending up from a support surface, the pod including an inlet valve through which gas passes from the support surface into the pod, the inlet valve including a plunger biased into contact with sidewalls of the inlet valve to prevent a flow of gas through the inlet valve, the system comprising:

a pin mounted in an opening in the support surface, gas passing from the remote source through said opening, said pin biasing the plunger away from the sidewalls of the inlet valve to thereupon allow the flow of gas through the inlet valve; and a flexible seal mounted within a bottom of the inlet valve, said flexible seal capable of substantially preventing leakage of gas between the support surface and the inlet valve around said flexible seal upon seating of the pod on the at least one support structure and expansion of said flexible seal, wherein a flow of the gas from the support surface into the pod expands said flexible seal.

* * * * *